(12) United States Patent
Jormanainen et al.

(10) Patent No.: US 7,467,209 B1
(45) Date of Patent: Dec. 16, 2008

(54) CONNECTION MANAGEMENT IN ATM BASED NETWORK AND IN ATM NETWORK ELEMENTS

(75) Inventors: Rainer Jormanainen, Jokela (FI); Timo Harjunen, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 10/149,734

(22) PCT Filed: Dec. 23, 1999

(86) PCT No.: PCT/EP99/10363

§ 371 (c)(1),
(2), (4) Date: Sep. 19, 2002

(87) PCT Pub. No.: WO01/49063

PCT Pub. Date: Jul. 3, 2001

(51) Int. Cl.
*G06F 15/16* (2006.01)
(52) U.S. Cl. .................. 709/228; 709/226; 709/227; 709/250; 370/401
(58) Field of Classification Search ................ 709/228, 709/250, 226, 227; 370/401
See application file for complete search history.

(56) References Cited

U.S. PATENT DOCUMENTS

| | | | | |
|---|---|---|---|---|
| 5,838,921 A | * | 11/1998 | Speeter | 709/227 |
| 6,343,322 B2 | * | 1/2002 | Nagami et al. | 709/227 |
| 6,606,310 B1 | * | 8/2003 | Vialen et al. | 370/338 |
| 6,714,989 B1 | * | 3/2004 | Mizutani et al. | 709/250 |
| 6,781,994 B1 | * | 8/2004 | Nogami et al. | 370/395.1 |

FOREIGN PATENT DOCUMENTS

WO     WO 95/15635     6/1995

* cited by examiner

*Primary Examiner*—Tonia L Dollinger
*Assistant Examiner*—Kyung H Shin
(74) *Attorney, Agent, or Firm*—Squire, Sanders & Dempsey, LLP

(57) ABSTRACT

According to an embodiment of the present invention, a distributed connection management in an ATM network element with distributed connection control comprising a plurality of control units is disclosed. A managing unit receives a connection request for connecting a first and a second termination point, and determines control units in charge of the first and second termination points to be connected. The first and second termination point control units both store information about the first and second termination points and request connection between the first and second termination points. Alternatively, according to a second embodiment of the present invention, the managing unit receives a connection request for connecting a first and a second termination point, determines control units for the first and second termination points to be connected out of a plurality of existing control units, and determines a third control unit for controlling the connection out of the plurality of existing control units, and the third control unit then requests connection between the first and second termination points.

15 Claims, 6 Drawing Sheets

CONNECTION MANAGEMENT IN ATM BASED NETWORK AND IN ATM NETWORK ELEMENTS

PRIORITY CLAIM

This is a U.S. national stage of PCT application No. PCT/EP99/10363, filed on Dec. 23, 1999. Priority is claimed on that application.

FIELD OF THE INVENTION

The present invention relates to distributed ATM (Asynchronous Transfer Mode) connection control, and in particular to a method of managing connections in an ATM network element with distributed connection control comprising a plurality of control units, an ATM network element with distributed connection control comprising a plurality of control units and a telecommunications system comprising at least one ATM network element according to the present invention.

BACKGROUND OF THE INVENTION

In an ATM network element acting as a switch in an ATM based telecommunications network, connection control is distributed to plural control units. The distributed ATM connection control poses a problem due to the fact that information distributed within the connection control has to be consistent and correct throughout the network element. In this context, distributed information refers to basic ATM logical resources such as interface, virtual path termination point (VPtp) and virtual channel termination point (VCtp) and the connections between these instances.

Because of the distributed connection control it is not transparent how a connection is created between termination points. Thus, it cannot be ensured that a connection affects only one unit of connection control and that the termination points connected are controlled by the same control unit.

SUMMARY OF THE INVENTION

It is therefore an object of the present invention to provide distributed control management in an ATM network element comprising a plurality of control units.

According to a first embodiment of the present invention, this object is achieved by a method of managing connections in an ATM network element with distributed connection control comprising a plurality of control units. According to FIG. 1, this method comprises a first step of receiving a connection request for connecting a first and a second termination point. In the next step, control units in charge of the first and second termination points to be connected are determined. Then, information about the first and second termination points are stored in both the first and second termination point control units. Finally, a connection between the first and second termination points is requested.

Moreover, according to the first embodiment of the present invention, the above-mentioned object is solved by an ATM network element with distributed connection control as shown in FIG. 3. The network element comprises a plurality of control units and a managing unit for receiving a connection request for connecting a first and a second termination point. The managing unit determines control units in charge of the first and second termination points to be connected (control unit 1 and control unit 2 according to FIG. 3). The first and second termination point control units both store information about the first and second termination points and request connection between the first and second termination points.

According to the first embodiment, connection control is divided into a plurality of management areas each being under control of one control unit. This control unit is in charge of all interfaces inside the respective management area, an interface comprising at least one termination point. The control unit knows all logical resources inside its management area.

The managing unit stores interface identifiers and determines the control unit in charge using the interface identifiers. The managing unit can be implemented in the network element as file, library or program.

In a telecommunications system comprising at least one ATM network element according to the first embodiment of the present invention, in case of a failure of a control unit, termination points and connections within the management area being controlled by the control unit are lost. However, since a connection is handled by two control units, it can be saved. This requires that each control unit gets notification of a failure of the other control units. Furthermore, it is required that the control units get notification about restart of the other control units. After receiving a control unit restart notification, each control unit searches all termination points in the connections related to the restarted control units. Then, all connections to the restarted control units are re-established by sending re-establish requests.

If one control unit would handle termination points of only one logical interface, all connections could be saved in the case of a failure. Anyhow, this would not be appropriate since there are too many logical interfaces compared with the number of control units where the connections could be handled.

In order to solve such problem, a spare connection control can be provided. With the spare connection control, a spare connection control unit for connections inside one management area or control unit area is provided. This spare control unit actually is the (main) control unit for some other area. Now, when the managing unit receives a connection request that would be handled inside one connection control unit (i.e. one management area) for both termination points, it also determines a spare control unit in which the connection information is stored (i.e. the connection information is duplicated). Now, the connection information is present in both the spare control unit and the (main) control unit. In this case, if the (main) control unit suffers a failure, the original situation can be restored by loading data from the spare control unit. Thus, all connections can be saved in the case of a failure.

With the first embodiment of the present invention it can be ensured that information distributed in the connection control is consistent and correct throughout the network element.

The distribution of connection control functionality according to the first embodiment of the present invention suggests that the connection admission control functionality should follow the same distribution method.

According to a second embodiment of the present invention, the above-mentioned object is achieved by a method of managing connections in an ATM network element with distributed connection control comprising a plurality of control units. As shown in FIG. 2, this method comprises a first step of receiving a connection request for connecting a first and a second termination point. Thereupon, in a next step, control units for the first and second termination points to be connected are determined out of a plurality of existing control units. Then, a third control unit for controlling the connection is determined out of the plurality of existing control units. Finally, a connection between the first and second termination points is requested.

Moreover, according to the second embodiment of the present invention, the above-mentioned object is achieved by an ATM network element with distributed connection control as shown in FIG. 4. The network element comprises a plurality of control units and a managing unit. According to FIG. 4, the managing unit receives a connection request for connecting a first and a second termination point. Thereupon, the managing unit determines control units for the first and second termination points to be connected out of a plurality of existing control units. According to FIG. 4, the determined control units are control unit 1 and control unit 2. Furthermore, the managing unit determines a third control unit (control unit 3 in FIG. 4) out of the plurality of existing control units, for controlling the connection. Then, the third control unit requests connection between the first and second termination points.

According to the second embodiment of the present invention, the determination of the control units is performed by the managing unit on the basis of a selected algorithm. This algorithm may be a consecutive selection of one unit out of existing working units. A further selection method may also take into account the amount of maintained instances of termination points in the handling units.

The first and second control units handle the first and second termination points, respectively, and the third control unit handles the requested connection. The managing unit stores information about the termination points and the requested connection. The determined control units control the sequence needed for topology requests, acceptance from connection admission control and information delivery to ATM layer functions.

In a telecommunications system comprising at least one ATM network element according to the second embodiment of the present invention, ATM connection control functionality and data storage is distributed to several parallel units. One control unit (control unit 3 in FIG. 4) is aware of the connection between two termination points each handled by different control units (control units 1 and 2 in FIG. 4). Thus, it can be ensured that the termination points connected are under the same unit of connection control.

In the following the present invention will be described by way of preferred embodiments thereof with reference to the accompanying drawings 5 to 8.

DESCRIPTION OF THE PREFERRED EMBODIMENTS

In the following, a first embodiment of the present invention will be described by referring to FIGS. 5 to 7.

The first embodiment provides a solution of the object of the present invention, which is based on the topology of the ATM network element. In the network element, the locations of different logical interfaces are distributed. According to the first embodiment, interfaces within one management area in the network element are assigned to one connection control unit. The connection control unit is responsible for all logical resources inside this management area, the logical resources comprising interfaces, VPtps (Virtual Path termination points) and VCtps (Virtual Channel termination points).

Figure 1:
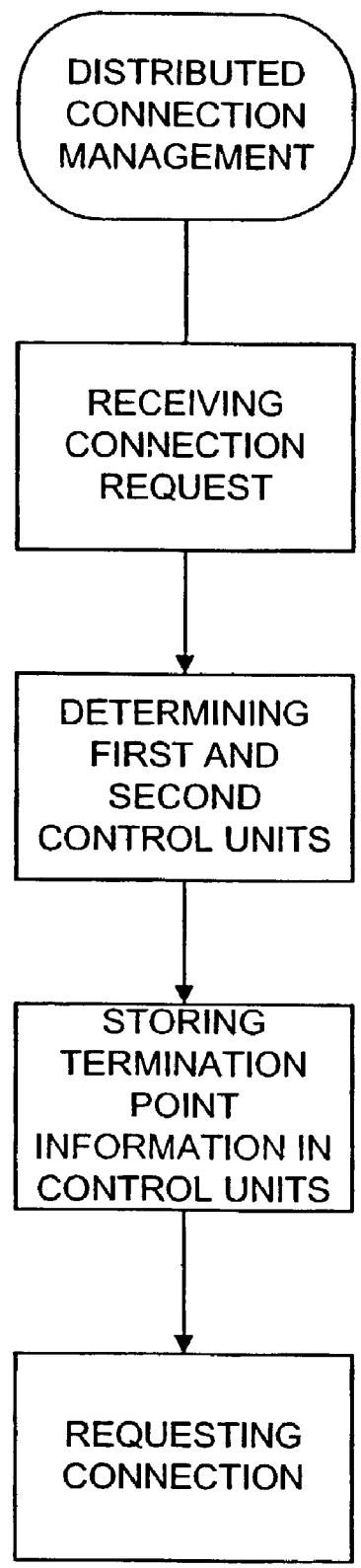
FIG. 1 is a flowchart showing basic steps of a distributed connection managing method according to a first embodiment of the present invention.
Figure 2:
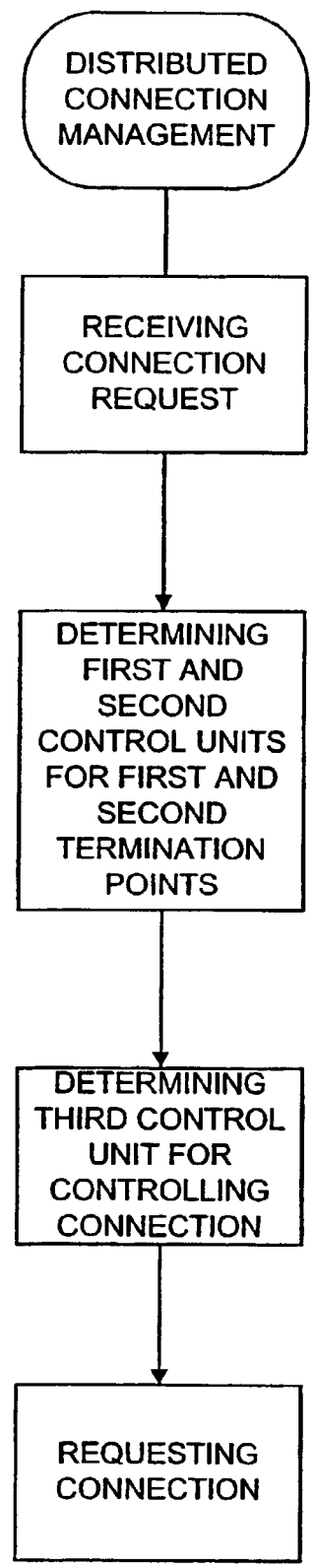
FIG. 2 is a flowchart showing basic steps of a distributed connection managing method according to a second embodiment of the present invention.
Figure 3:
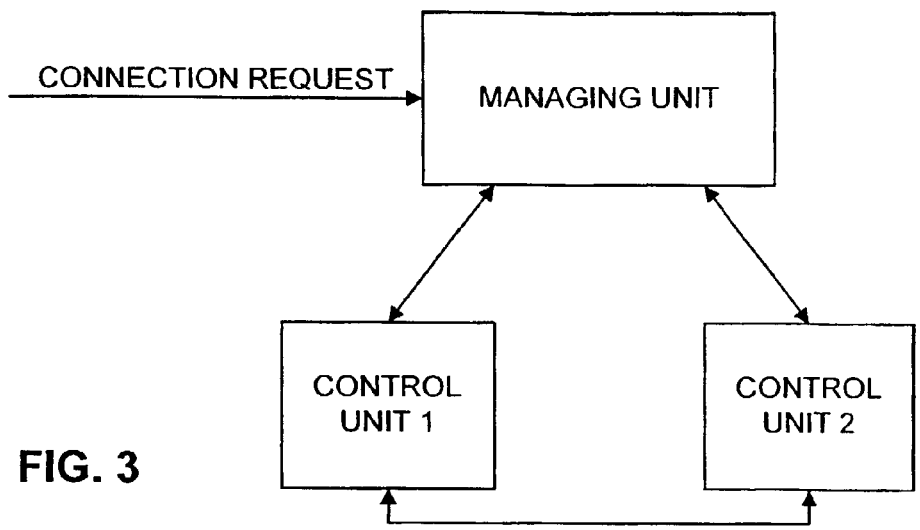
FIG. 3 is a schematic block diagram showing basic elements for illustrating distributed connection control in an ATM network element according to the first embodiment of the present invention.
Figure 4:
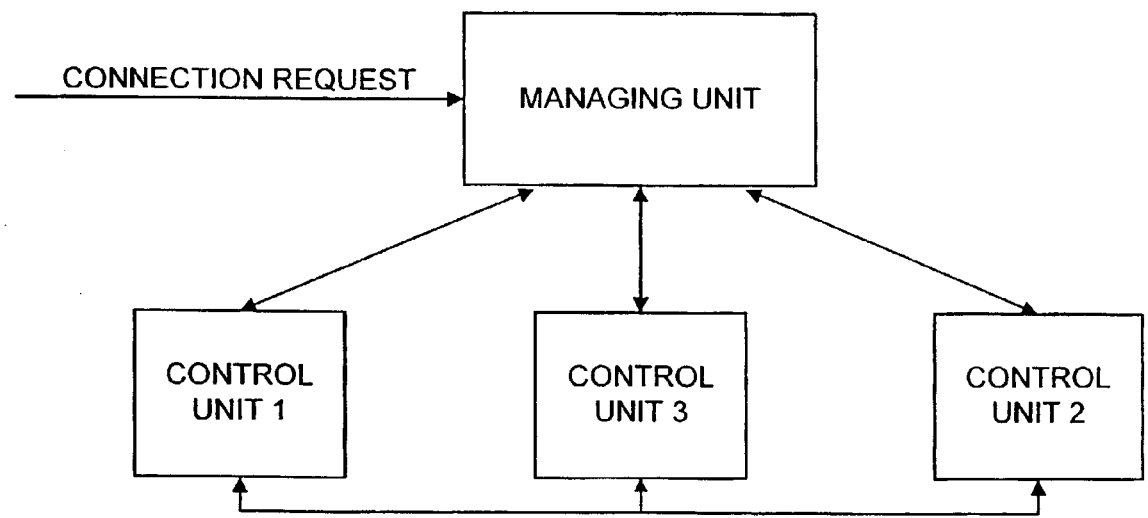
FIG. 4 is a schematic block diagram showing basic elements for illustrating distributed connection control in an ATM network element according to the second embodiment of the present invention.
Figure 5:
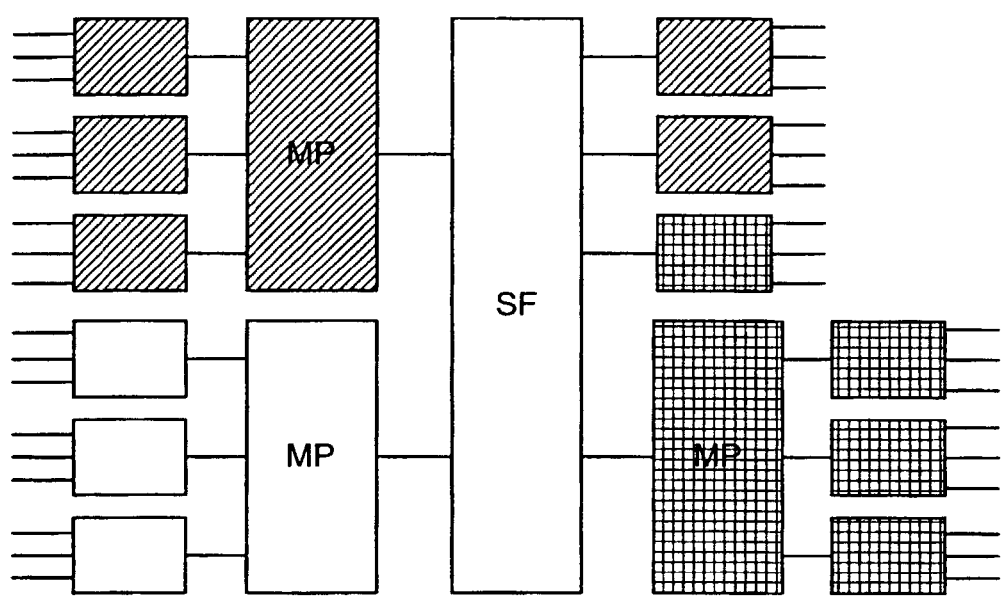
FIG. 5 is a schematic block diagram showing a certain ATM network element topology.

FIG. 5 shows connection between network computers or interfaces indicated by small boxes in FIG. 5, multiplexers MPs and a switching fabric SF. The interfaces either connect directly to the switching fabric SF or through a respective multiplexer MP.

In FIG. 5, the differently hatched blocks each represent different management areas. For example, the rule for distributed connection control is that a multiplexer MP is always handled by the same connection control unit which handles instances behind the multiplexer. This solution simplifies the termination point management in certain cases where an address conversion function is required at the tributary unit.

As can be seen from FIG. 5, there are three different connection control units, one for each management area. Each connection control unit is responsible for all interfaces inside the corresponding management area. Moreover, each connection control unit is responsible for all logical resources in the corresponding management area.

Figure 6:
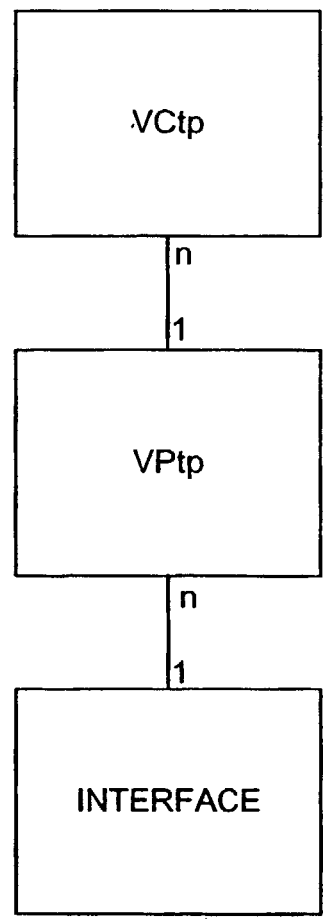
FIG. 6 is a schematic block diagram of a relationship between logical ATM resources.

FIG. 6 shows the relationship between logical ATM resources such as interface, VPtp and VCtp. A termination point of the interface having one output line connects to the VPtp which comprises a plurality of input lines n. The VPtp having one output line in turn connects to the VCtp comprising a plurality of input lines n.

In case of a connection between interfaces (or VPtps, OR VCtps), connection information is distributed with the termination point information of the interfaces to be connected. In other words, when a connection between termination points of two different interfaces is created, information about the termination points to be connected is stored at two different places. According to the first embodiment, the control units in charge of the termination points to be connected store both information about their own termination point and information about the other termination point being part of the requested connection.

Service providers are located in the ATM telecommunications system by means of management units or brokers. A broker is implemented in the systems such that for a given logical interface the broker determines one connection control unit to be used for this interface. The broker service can be provided in the system by means of a file, a library or a small program managing the required data structure.

The broker is used by users of the connection management service. User requests are typically create, delete or modify requests for termination points and connections between termination points of different interfaces. Common to all these requests is that they relate to one interface (one termination point) or plural interfaces (plural termination points). Therefore, the interface identification is very suitable. For this purpose, the broker stores interface identifiers indicating the management areas to which the interfaces belong in order to determine the control units in charge of the interfaces.

According to the first embodiment, the connection control units use the broker in order to find out the other connection control units being part of a request connection between termination points. A connection between termination points is handled by storing in the control unit being part of the connection the "own" termination point information and the information of the termination point belonging to the other control unit. This leads to a negotiation between connection control units in which one control unit exchanges the termination point information with an other control unit holding the information of the other termination point in the connection.

Figure 7:
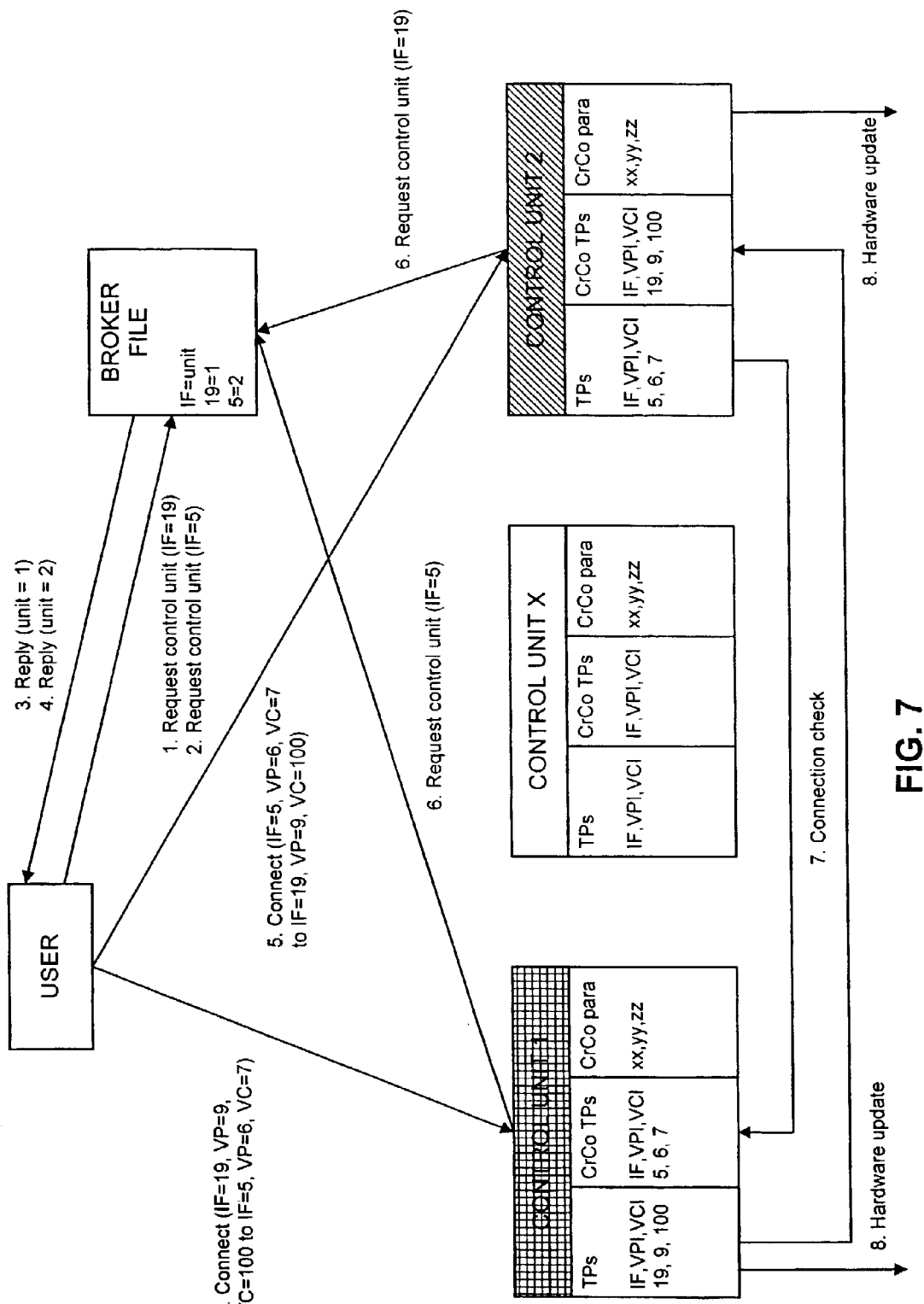
FIG. 7 is a schematic block diagram illustrating a connection creation between two termination points according to the first embodiment of the present invention.

FIG. 7 shows a connection creation between termination points of two different interfaces. In FIG. 7, a user requests control units for the interfaces IF19 and IF5 to be connected in communications 1 and 2. The broker implemented as a broker file determines the control units in charge of the interfaces to be connected using the stored interface identifiers. In this example, the broker determines a control unit 1 for the interface IF19 and a control unit 2 for the interface IF5 and replies the control units in communications 3 and 4. Thereupon, the user connects to the control units 1 and 2 determined by the broker in communications 5. The control unit 1 stores information about the termination points of its interface IF19, its virtual path identifier VPI9 and its virtual channel identifier VCI100, as well as information about the termination points to be connected, i.e. the termination points of the control unit 2, such as IF5, VPI6 and VC17. The control unit 2 stores its termination point information IF5, VPI6 and VCI7 as well as termination point information of the control unit 1, i.e. IF19, VPI9 and VCI100.

Then, in communications 6, the control units 1 and 2 request the respectively other control unit forming part of the connection between the termination points. In other words, connection between the termination points is requested by the control units 1 and 2, and in communications 7, a connection check of the requested connection is performed. Finally, in communications 8, the control units 1 and 2 each perform hardware update.

When in the case of a failure termination points and connections of an interface controlled by a control unit are lost, according to the first embodiment, the connection handled by two control units can be saved. This requires that each connection control unit is notified by the other control unit of a failure. Furthermore, it is required that the control units are notified of a restart of other control units. After receiving a connection control restart notification, each control unit tries to find out all the termination points in the connections related to the restarted control units. All the connections with the restarted control units are then re-established by sending re-establish requests.

If one control unit would handle termination points of only one logical interface, all connections could be saved in the case of a failure. However, this would not be feasible because there are too many logical interfaces compared with the number of control units handling the connections.

In the following, a second embodiment of the present invention will be described by referring to FIG. 8.

Figure 8:
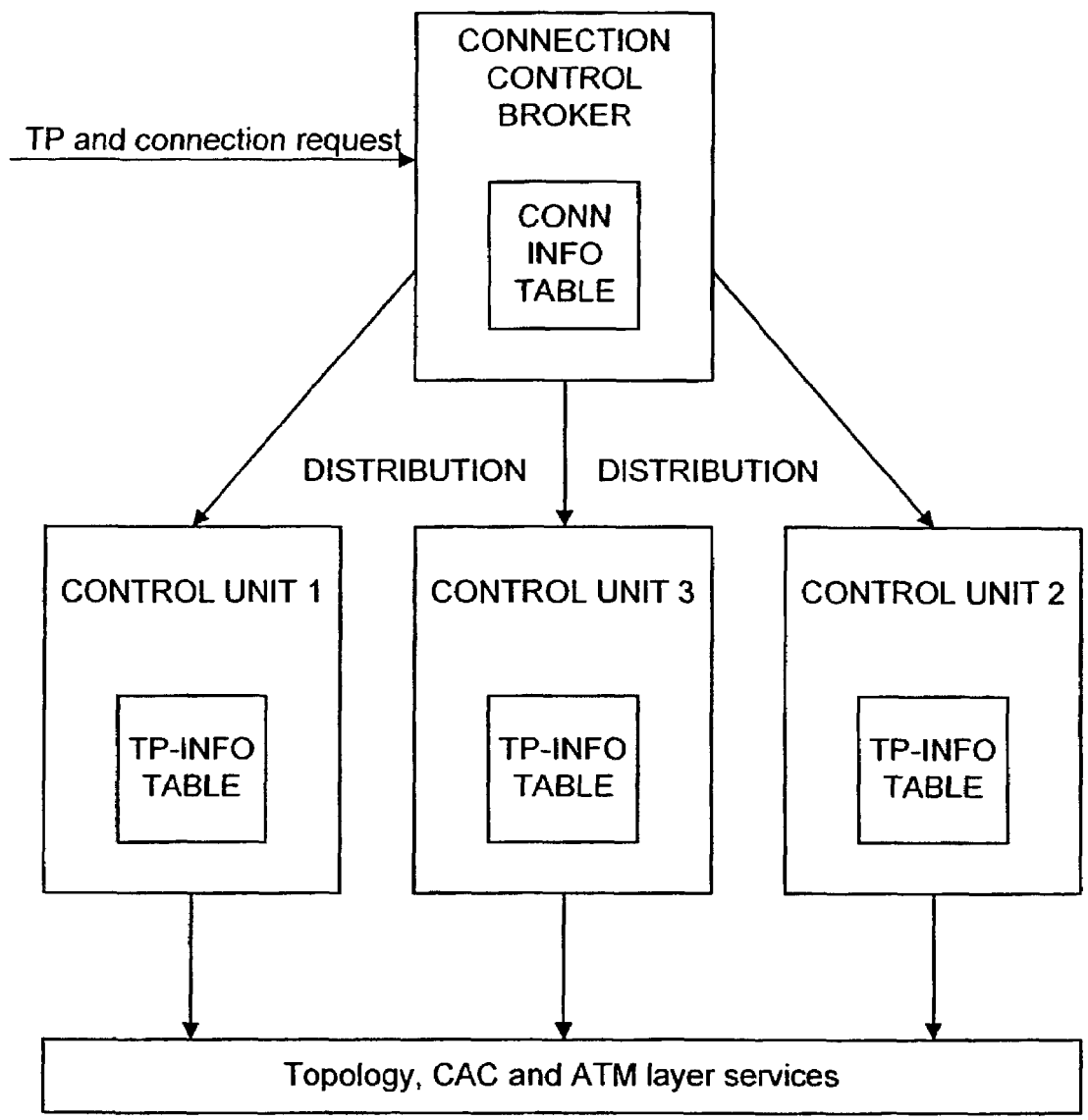
FIG. 8 is a schematic block diagram illustrating connection control distribution according to the second embodiment of the present invention.

FIG. 8 illustrates a distribution of the ATM connection control functionality and data storage to several parallel units.

As shown in FIG. 8, termination point TP and connection requests are directed to a managing unit or connection control broker. The broker service can be provided in the system by means of a file, a library or a small program managing the required data structure. For each request, the broker creates a hand to handle the tasks needed for the request. The hand is alive only the time needed for the request.

The broker selects termination point identifier values, i.e. the free VPI (virtual path identifier) and VCI (virtual channel identifier) values, for a requested termination point of an interface. The identifiers are stored in a connection information table (conn info table) of the broker. Data or attributes of the respective termination point identifiers (TPIs) are stored in termination point information tables (TP-info tables) of the respective control units. The selection of the handling control unit is performed by the broker by means of a selected algorithm. For example, this algorithm can be a consecutive selection of one unit out of existing working units. Moreover, a selection method can also take into account the amount of maintained instances of TPs in the handling units. The broker also performs conformance definition checking for the TP and connection requests.

In the distributed parallel control units, the specific termination point and connection requests are handled. For each request a hand is created in the respective control unit to handle the tasks needed for the request. The hand is only alive the time needed for the request.

Each control unit stores the termination point information in its TP-info table and handles the sequences needed for topology requests, acceptance from connection admission control (CAC) and information delivery to ATM layer functions.

According to FIG. 8, when the broker receives a connection request for connecting two termination points of different interfaces, the broker creates a hand to handle the request. Then, the broker checks the validity of the request and also selects free VPI and VCI values for each termination point and stores the values in the connection information table. Then, the broker determines control units for handling the respective termination points and sends a virtual channel termination point creation signal for the first termination point to a control unit 1 and a virtual channel termination point creation signal for the second termination point to a control unit 2.

In the control units 1 and 2, respectively, a hand is created to perform the requested tasks. The termination point information about the first termination point is stored in the TP-info table of the control unit 1 and the termination point information about the second termination point is stored in the TP-info table of the control unit 2. The sequences required for topology requests, acceptance from CAC and ATM layer services are handled by the control units 1 and 2. Thereafter, each unit hand returns a record index of the termination point information record stored in the respective TP-info tables to the broker hand. The broker updates the received termination point record index and information about the handling control units (units 1 and 2) in the termination point information record in its connection information table.

Then, the broker determines a control unit to handle the requested connection. As shown in FIG. 8, the broker sends a connection creation to control unit 3. The control unit 3 creates a hand to perform the requested tasks and the sequences required for topology requests, acceptance from CAC and ATM layer services. Finally, the rest of the connection information is stored in the connection information table of the broker.

According to the second embodiment of the present invention, ATM connection control functionality and data storage is distributed to several parallel units. One control unit (control unit 3) is aware of the connection between two termination points each handled by different control units (control units 1 and 2). Thus, it can be ensured that the termination points connected are under the same unit of connection control.

While the invention has been described with reference to preferred embodiments, the description is illustrative of the invention and is not to be construed as limiting the invention. Various modifications and applications may occur to those skilled in the art without departing from the true spirit and scope of the invention as defined by the appended claims.

What is claimed is:

1. A method comprising:
    receiving, in a managing unit of an asynchronous transfer mode network element configured to perform switching in an asynchronous transfer mode based telecommunications network and which comprises a plurality of controllers to which connection control is distributed, a connection request for connecting a first and a second termination point;
    assigning in the managing unit, out of the plurality of controllers, a first controller to handle the first termination point of the connection request and a second controller to handle the second termination point of the connection request;
    assigning in the managing unit, out of the plurality of controllers, a third controller to handle connection between the first and the second termination points handled by the first and the second controllers, respectively; and
    requesting in the third controller the connection between the first and second termination points, such that the third controller is aware of the connection between the first and second termination points handled by the first and second controllers, respectively, wherein the receiving comprises receiving in the managing unit of an asynchronous transfer mode network element which comprises a plurality of interfaces, and wherein the connection request is configured to create a connection between a first and a second termination point, the first and second termination points belonging to different interfaces of the plurality of interfaces.

2. The method according to claim 1, wherein the assignment of the controllers is performed by the managing unit on the basis of a selected algorithm.

3. The method according to claim 2, wherein information about the termination points and the requested connection is stored in the managing unit.

4. An apparatus, comprising:
    a plurality of controllers to which connection control is distributed, and wherein at least one of said controllers performs a request to connect a first and a second termination point, wherein a first controller is assigned out of the plurality of controllers to handle the first termination point of the connection request and a second controller is assigned to handle the second termination point of the connection request, and a third controller is assigned out of the plurality of controllers to handle connection between the first and the second termination points handled by the first and the second controllers, respectively;
    a managing unit configured to receive a connection,
    wherein the third controller is configured to request the connection between the first and second termination points, such that the third controller is aware of the connection between the first and second termination points handled by the first and second controllers, respectively, wherein the apparatus comprises an asynchronous transfer mode network element; and
    a plurality of interfaces, and wherein the connection request is configured to create a connection between a first and second termination point, the first and second termination points belonging to different interfaces of the plurality of interfaces.

5. The apparatus according to claim 4, wherein the management unit is configured to perform the assignment of the controllers on the basis of a selected algorithm.

6. The apparatus according to claim 4, wherein information about the termination points and the requested connection is stored in the managing unit.

7. The apparatus according to claim 4, wherein the first, second and third controllers are configured to control the sequence needed for topology requests, acceptance from connection admission control and information delivery to asynchronous transfer mode layer functions.

8. An apparatus, comprising:
    a plurality of controllers to which connection control is distributed, and wherein at least one of said controllers performs a request to connect a first and a second termination point, wherein a first controller is assigned out of the plurality of controllers to handle the first termination point of the connection request and a second controller is assigned to handle the second termination point of the connection request, and a third controller is assigned out of the plurality of controllers to handle connection between the first and the second termination points handled by the first and the second controllers, respectively;
    a managing unit configured to receive a connection,
    wherein the third controller is configured to request the connection between the first and second termination points, such that the third controller is aware of the connection between the first and second termination points handled by the first and second controllers, respectively, the apparatus comprises an ATM network element which comprises said plurality of controllers; and
    a plurality of interfaces, and wherein the connection request is configured to create a connection between a first and second termination point, the first and second termination points belonging to different interfaces of the plurality of interfaces.

9. An apparatus, comprising:
    a plurality of controllers to which connection control is distributed, and wherein at least one of said controllers performs a request to connect a first and a second termination point, wherein a first controller is assigned out of the plurality of controllers to handle the first termination point of the connection request and a second controller is assigned to handle the second termination point of the connection request, and a third controller is assigned out of the plurality of controllers to handle connection between the first and the second termination points handled by the first and the second controllers, respectively;
    a managing unit configured to receive a connection, wherein the managing unit is configured to perform the assignment of the controllers on the basis of a selected algorithm
    wherein the third controller is configured to request the connection between the first and second termination points, such that the third controller is aware of the connection between the first and second termination points handled by the first and second controllers, respectively, wherein the apparatus comprises an asynchronous transfer mode network element which comprises said plurality of controllers; and a plurality of interfaces, and wherein the connection request is configured to create a connection between a first and second termination point, the first and second termination points belonging to different interfaces of the plurality of interfaces.

10. An apparatus, comprising:

a plurality of controllers to which connection control is distributed, and wherein at least one of said controllers performs a request to connect a first and a second termination point, wherein a first controller is assigned out of the plurality of controllers to handle the first termination point of the connection request and a second controller is assigned to handle the second termination point of the connection request, and a third controller is assigned out of the plurality of controllers to handle connection between the first and the second termination points handled by the first and the second controllers, respectively;

a managing unit configured to receive a connection wherein information about the termination points and the requested connection is stored in the managing unit, wherein the third controller is configured to request the connection between the first and second termination points, such that the third controller is aware of the connection between the first and second termination points handled by the first and second controllers, respectively, wherein the apparatus comprises an asynchronous transfer mode network element which comprises said plurality of controllers; and a plurality of interfaces, and wherein the connection request is configured to create a connection between a first and second termination point, the first and second termination points belonging to different interfaces of the plurality of interfaces.

11. An apparatus, comprising:

a plurality of controllers to which connection control is distributed, and wherein at least one of said controllers performs a request to connect a first and a second termination point, wherein a first controller is assigned out of the plurality of controllers to handle the first termination point of the connection request and a second controller is assigned to handle the second termination point of the connection request, and a third controller is assigned out of the plurality of controllers to handle connection between the first and the second termination points handled by the first and the second controllers, respectively, and wherein the first, second and third controllers are configured to control the sequence needed for topology requests, acceptance from connection admission control and information delivery to asynchronous transfer mode layer functions;

a managing unit configured to receive a connection, wherein the third controller is configured to request the connection between the first and second termination points, such that the third controller is aware of the connection between the first and second termination points handled by the first and second controllers, respectively, wherein the apparatus comprises an asynchronous transfer mode network element which comprises said plurality of controllers; and a plurality of interfaces, and wherein the connection request is configured to create a connection between a first and second termination point, the first and second termination points belonging to different interfaces of the plurality of interfaces.

12. An apparatus, comprising:

a plurality of controllers to which connection control is distributed; and a managing unit being configured to receive a connection request to connect a first and a second termination point, assign out of the plurality of controllers a first controller to handle the first termination point of the connection request and a second controller to handle the second termination point of the connection request, and assign a third controller out of the plurality of controllers to handle connection between the first and the second termination points handled by the first and the second controllers, respectively, wherein the apparatus comprises an asynchronous transfer mode network element; and a plurality of interfaces, and wherein the connection request is configured to create a connection between a first and second termination point, the first and second termination points belonging to different interfaces of the plurality of interfaces.

13. An apparatus, comprising:

a controller of a plurality of controllers to be used in the apparatus, which comprises an asynchronous transfer mode network element, with distributed connection control to perform switching in an asynchronous transfer mode based telecommunications network, wherein connection control is distributed to the plurality of controllers;

a managing unit which assigns the controller out of the plurality of controllers, wherein the controller being configured to handle connection between first and second termination points handled by first and second controllers out of the plurality of controllers, respectively, and the controller being further configured to request the connection between the first and the second termination points, such that the controller is aware of the connection between the first and second termination points handled by the first and second units, respectively;

a plurality of interfaces, wherein the connection request is configured to create a connection between a first and second termination point, the first and second termination points belonging to different interfaces of the plurality of interfaces.

14. An apparatus, comprising:

managing means configured to receive a connection request for connecting a first and a second termination point, and assign;

a first control means for handling the first termination point for the connection request;

a second control means for handling the second termination point for the connection request, and;

a third control means for handling connection between the first and the second termination points handled by the first and the second control means, respectively, wherein the third control means is configured to request the connection between the first and second termination points, such that the third control means is aware of the connection between the first and second termination points handled by the first and second control means, respectively, wherein the apparatus comprises an asynchronous transfer mode network element; and interfacing means, wherein the connection request is configured to create a connection between a first and second termination point, the first and second termination points belonging to different interfaces of the interfacing means.

15. A computer program embodied on a computer readable medium, said computer program configured to control a processor to perform;

receiving, in a managing unit of an asynchronous transfer mode network element configured to perform switching in an asynchronous transfer mode based telecommunications network and which comprises a plurality of controllers to which connection control is distributed, a connection request for connecting a first and a second termination point;

assigning in the managing unit, out of the plurality of controllers, a first controller to handle the first termination point of the connection request and a second controller to handle the second termination point of the connection request;

assigning in the managing unit, out of the plurality of controllers, a third controller to handle connection between the first and the second termination points handled by the first and the second controllers, respectively; and requesting in the third controller the connection between the first and second termination points, such that the third controller is aware of the connection between the first and second termination points handled by the first and second controllers, respectively, wherein the asynchronous transfer mode network element comprises a plurality of interfaces, and wherein the connection request is configured to create a connection between a first and second termination point, the first and second termination points belonging to different interfaces of the plurality of interfaces.

* * * * *